United States Patent [19]

Posiviata et al.

[11] Patent Number: 4,486,183
[45] Date of Patent: Dec. 4, 1984

[54] TORSIONALLY ELASTIC POWER TRANSMITTING DEVICE AND DRIVE

[75] Inventors: Richard W. Posiviata, Lakewood; Dennis Kemper, Aurora; William L. Westhoff, Denver, all of Colo.

[73] Assignee: The Gates Rubber Company, Denver, Colo.

[21] Appl. No.: 164,652

[22] Filed: Jun. 30, 1980

[51] Int. Cl.³ .................... F16H 55/14; F16D 3/12
[52] U.S. Cl. ...................... 474/94; 267/148; 267/149; 464/74
[58] Field of Search ............ 474/94, 263; 64/14, 64/27 NM; 267/148, 149, 153; 192/106.1; 464/73, 74, 83, 89

[56] References Cited

U.S. PATENT DOCUMENTS

| 1,872,136 | 8/1932 | Gibson | 474/94 X |
|---|---|---|---|
| 1,894,432 | 1/1933 | Watson | 474/94 X |
| 2,615,316 | 10/1952 | Kirwin | 474/94 |
| 2,621,493 | 12/1952 | Croset | 64/14 |
| 2,659,219 | 11/1953 | Mosso et al. | 64/14 |
| 2,764,003 | 9/1956 | Croset | 64/14 |
| 2,873,590 | 2/1959 | Croset | 64/14 |
| 3,106,076 | 10/1963 | Bastow | 64/14 |
| 3,314,512 | 4/1967 | Keresturg | 64/14 |
| 3,345,831 | 10/1967 | Book | 64/14 |
| 3,404,578 | 10/1968 | Koch et al. | 474/263 |
| 3,535,946 | 10/1970 | Miller | 474/263 |
| 3,636,729 | 1/1972 | Patel | 64/14 |
| 3,951,006 | 4/1976 | Fisher et al. | 474/87 |
| 4,027,545 | 6/1977 | White, Jr. | 474/263 X |
| 4,027,865 | 6/1977 | Greenwood et al. | 267/148 |
| 4,194,373 | 3/1980 | Jennings et al. | 64/14 |

FOREIGN PATENT DOCUMENTS

| 564121 | 2/1958 | Belgium | 474/94 |
|---|---|---|---|
| 1557832 | 12/1979 | United Kingdom | 474/83 |

OTHER PUBLICATIONS

UK Patent application #2,047,384, published 11/26/80, Inventors Grote et al.

Primary Examiner—Rodney H. Bonck
Attorney, Agent, or Firm—Raymond Fink; H. W. Oberg, Jr.; C. H. Castleman

[57] ABSTRACT

A shock-absorbing torsionally elastic power transmitting device is described having resilient cushioning means loaded with modulus-increasing fibrous reinforcement, adapted to be interposed between mating lugs of a hub and rim configured to accommodate high torque levels simultaneously with relatively large angular deflections. The fibrous reinforcement is preferably aligned in the principal direction of displacement of the cushions under load. In another aspect, a torsionally elastic power transmitting device is used with V- or V-ribbed belt friction drive sheaves subject to slippage, to absorb torsional shocks and minimize heat build-up.

24 Claims, 7 Drawing Figures

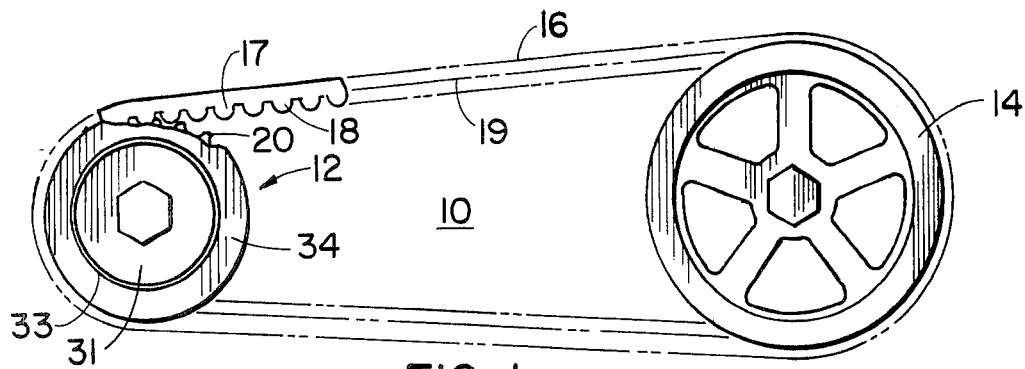
FIG. 1
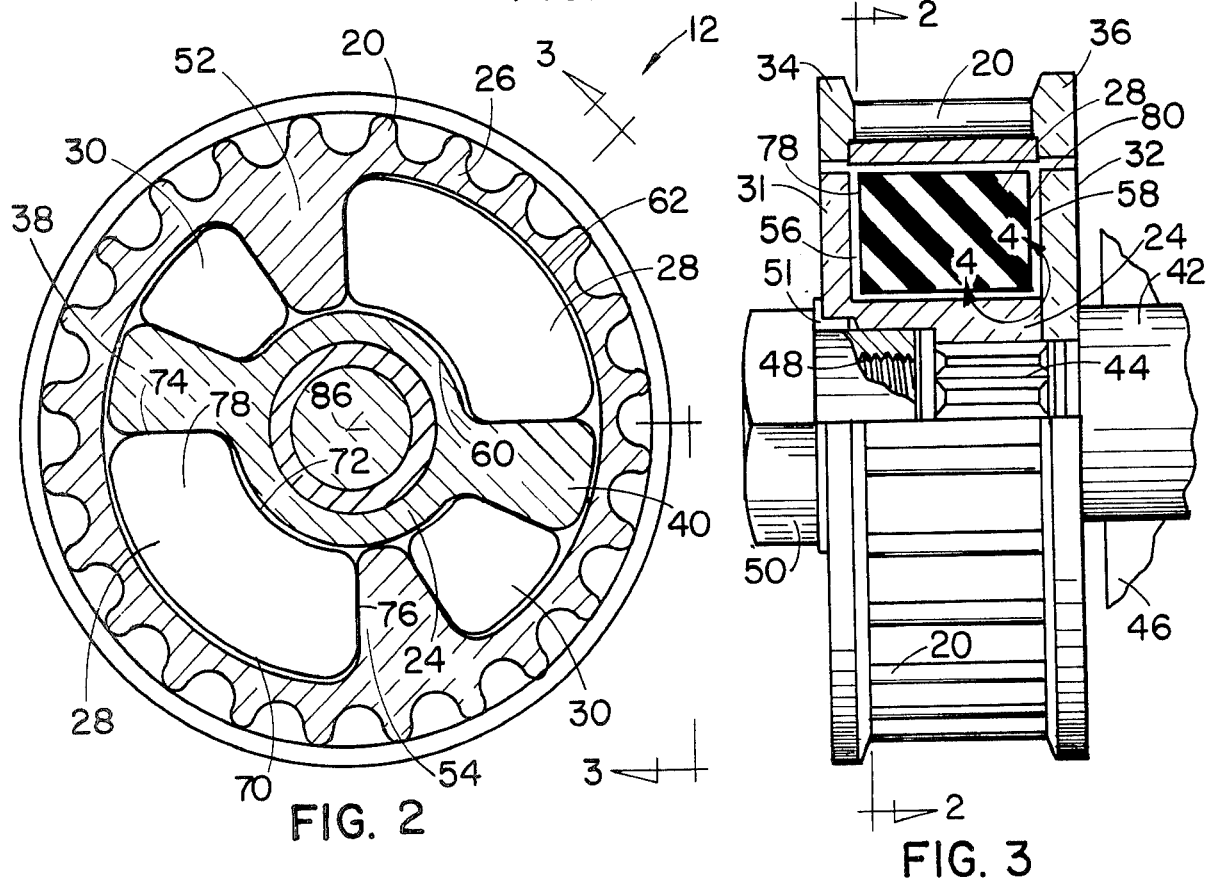
FIG. 2
FIG. 3
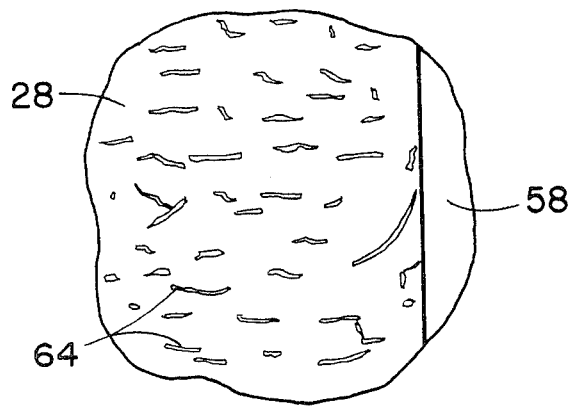
FIG. 4

TORSIONALLY ELASTIC POWER TRANSMITTING DEVICE AND DRIVE

CROSS REFERENCES TO RELATED APPLICATIONS

Copending and commonly assigned U.S. patent applications Ser. No. 900,459, filed Apr. 27, 1978 entitled "Shock Absorbing Sprocket and Drive Assembly", and Ser. No. 85,655, filed Oct. 17, 1979 entitled "Resilient Cushions For Elastic Isolator Power Transmission Devices", disclose shock-absorbing power transmission assemblies and resilient cushions for use therein, and are hereby incorporated by reference. In one aspect the present invention is drawn particularly to a cushioning means to compensate for very high peak loading, and to obtain a much flatter torque/angular deflection curve.

BACKGROUND OF THE INVENTION

This invention relates to rotary driven members and more particularly to torsionally elastic power transmission assemblies capable of absorbing or isolating torsional shocks and vibrations in a power drive train.

Power transmitting devices are known which are capable of dampening or isolating torsional shock loading and minimizing noise and vibration by the use of resilient cushioning means. Rubber cushions, for instance, are adapted to yieldingly transmit rotary motion between mating lugs of an integral hub and rim assembly. Typical known applications include cushioned sprockets for use with roller chain or synchronous belting (timing belts), direct gear drives, and torque transmission between shafts (flexible couplings), for instance. Various industrial applications are contemplated including those set forth in Koppers Company "Holset Resilient Couplings" catalog, March, 1973. Additional relevant prior art include, for instance, Croset U.S. Pat. No. 2,873,590, Kerestury U.S. Pat. No. 3,314,512 and the above-referenced copending applications.

The rubber cushions used in the torsionally elastic couplings of the referenced copending applications were especially effective in smoothing out vibrations and modulating torque peaks for the primary drive of motorcycles using synchronous drive belts. However, it was found that when subjected to abusive driving techniques, such as "speed shifts" where gear shifts are made without letting off on the throttle, the driven sprocket experienced very high torque peaks. During the speed shift the torsionally elastic driver sprocket assembly would wind up (along the "soft" portion of the torque deflection curve) allowing the driven sprocket to slow down. Subsequently when the flattened or "stiff" portion of the torque deflection curve was reached as the cushions filled their associated cavities, a large torque was suddenly applied causing a very high peak load on the drive due to inertial effects. In some cases the belt failed by tooth shear or breaking of the tensile reinforcement.

It is a primary object of this aspect of the invention to overcome the problems associated with such abusive conditions and to provide an elastomeric cushion spring having desirable spring rate and damping properties allowing much higher torques to be transmitted while still operating on the initial sloped ("soft") portion of the torque deflection curve, and simultaneously accommodating relatively large angular deflections for the drive.

In another vehicular application there is a trend toward extensive use of dynamically unbalanced four and six cylinder diesel and other engines exhibiting severe speed excursions at low rpm, especially for automobiles and trucks which are particularly vibration prone. Accessory drives for these engines transmit power from the crankshaft sheave to various driven sheaves usually linked with a number of separate V-belts or V-ribbed belts, or in the case of the so-called serpentine drive with a single V-ribbed belt, all working on a friction drive principle. These rough running engines, particularly the four and six cylinder diesels, have such high rpm excursions at idle speeds (below about 1000 rpm) that V-ribbed belts and other friction drive belts undergo tremendous slippage and elastomeric material shear relative to the tensile section, causing the belt and sheaves to heat up to such temperatures that in severe cases the belts have failed after only a single hour of operation on the drive.

In this latter aspect it is a primary object of this invention to overcome the slippage and heat build-up problems aforementioned associated with V-belt or V-ribbed or similar type friction drives. Examples of serpentine drives and other belt configurations useful in this aspect of the invention, and which drives and configurations are hereby incorporated by reference, include those disclosed in Fisher et al. U.S. Pat. No. 3,951,006.

SUMMARY OF THE INVENTION

Briefly described, in one aspect the invention pertains to a shock-absorbing torsionally elastic power transmitting device including a rotatable input drive means; a rotatable output driven means; and resilient spring cushions linking the input drive means to the output driven means in power transmitting relation and displaceable under load, the cushions comprising bodies of elastomeric material loaded with modulus-increasing dispersed fibrous reinforcement.

In an another aspect, the invention is directed to a shock-absorbing torsionally elastic belt sprocket or sheave assembly including a rotatable hub having at least two lugs protruding radially therefrom; a rotatable rim with at least two radially inwardly extending ears adapted to matingly engage the lugs of the hub, and having a peripheral surface configured to engage an endless power transmission belt; and resilient cushions interposed between the lugs and ears, comprising elastomeric material in which is embedded discrete reinforcement fibers functioning to substantially increase the dynamic modulus of the cushions.

In another aspect, the invention pertains to a shock-absorbing, speed excursion reducing torsionally elastic single or multiple V-belt or V-ribbed belt power transmission friction drive assembly comprising: a plurality of sheaves having a peripheral surface provided with at least one V-shaped groove on its driving surface adapted to receive the belt in driving relation; at least one of said sheaves being shock-absorbing and including a rotatable hub having at least two lugs protruding therefrom, a rotatable rim with at least two radially inwardly extending ears adapted to matingly engage the lugs of the hub (and whose peripheral surface is formed with said at least one V-shaped groove), and resilient elastomeric cushions interposed between the lugs and ears in driving relation; and a single or multiple V-belt or V-ribbed belt trained about the sheaves in friction driving relation.

Other aspects will become apparent from a reading of the description and claims.

BRIEF DESCRIPTION OF THE DRAWINGS

The invention in its preferred embodiments will be more particularly described by reference to the accompanying drawings, in which like parts are designated by like numerals in the various figures, and in which:

FIG. 1 is a partial cutaway view of a power transmission drive according to the invention, using a synchronous belt;

FIG. 2 is a sectional view of the leftmost sprocket of FIG. 1, taken along section 2—2 of FIG. 3;

FIG. 3 is a partial sectional view of the sprocket taken along section 3—3 of FIG. 2;

FIG. 4 is an enlarged view of a sectioned portion of a rubber cushion as shown at 4—4 of FIG. 3;

PREFERRED EMBODIMENTS OF THE INVENTION

Figure 5:
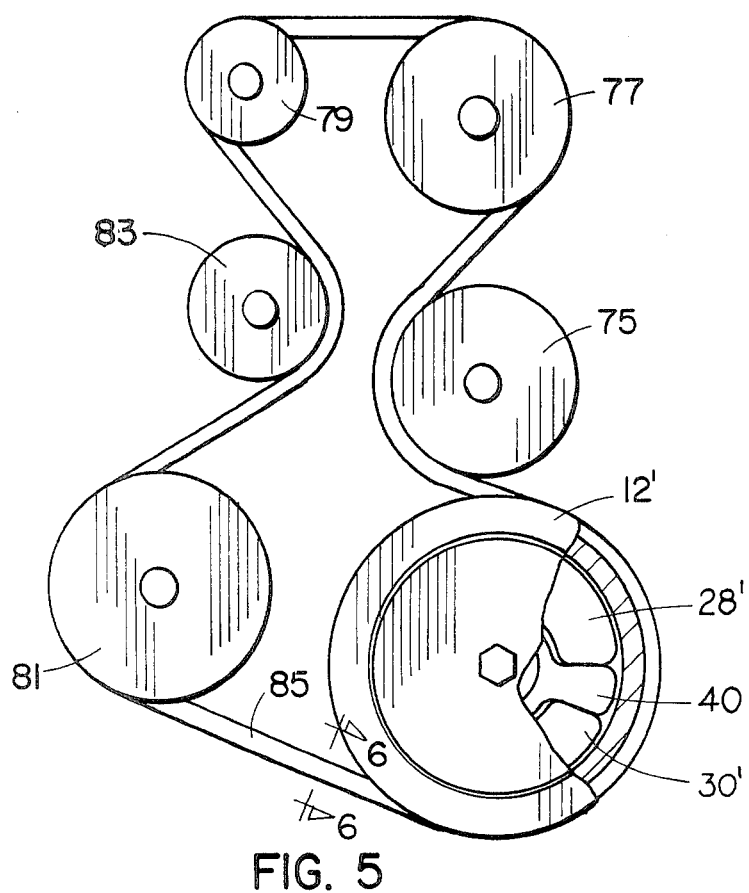
FIG. 5 is a schematic view of a serpentine V-ribbed belt drive for an using a torsionally elastic sheave in accordance with the invention.

The invention will be described with reference to a primary drive sprocket for a motorcycle in FIGS. 1-3, and as a crankshaft sheave for an automobile in FIGS. 5 and 6; however the power transmission assembly and cushioning means of the invention may be employed in various applications wherever torsional flexibility and elastic isolation between the hub and rim members is required in the transmission of rotary motion. For example, the devices of the invention are suitable for use in such diverse applications as transmission drives for business machines, tractive drives, air conditioner compressor drives, direct gear drives, chain drives, various belt drives, and in flexible couplings.

Referring first to FIGS. 1-3, a power transmission belt drive 10 for the primary drive of a motorcycle (linking engine output to transmission/clutch input) includes a shock-absorbing torsionally elastic drive sprocket 12 configured in accordance with the invention, a driven sprocket 14 which may be of conventional design, and a positive drive power transmission belt 16 trained about and linking sprockets 12 and 14 in synchronous driving relationship. Alternatively, the shock-absorbing sprocket may be the driven sprocket rather than the driver sprocket, either in the primary or secondary drive (linking transmission output to rear wheel) of a motorcycle.

The endless power transmission belt 16 is preferably formed of a polymeric body material 17 in which is embedded a tensile member 19. A plurality of teeth 18 are formed on the driving surface of the belt of a predetermined pitch to make mating engagement with corresponding teeth 20 of the shock-absorbing sprocket, and with the teeth of sprocket 14 (not shown).

The shock-absorbing sprocket assembly 12 of the invention is generally composed of a central hub 24 (input drive), outer rim 26 (output driven means), resilient spring cushioning means 28 and 30, flange bearings 31, 32 sandwiching the hub (with bearing 31 being integral with hub 24), and a pair of rim surfaces 34, 36 integral with the rim and forming radial bearing surfaces, e.g., 33 (FIG. 1), with each of the flange bearings 31, 32.

The hub 24 has at least two generally radially protruding lugs 38, 40 which serve to transmit torque to the rim. Depending upon the application and size of the sprocket assembly, it may be preferable to use at least three such lugs, to prevent any thrust-induced wobbles in the assembly. The major diameter of the hub as measured from tip-to-tip of lugs 38 and 40 in FIG. 2, is somewhat less than the internal diameter of the rim to allow clearance for rotative movement. A portion of the internal bore of the hub is splined to form a journaled fit with splines 44 formed on the motorcycle crankshaft 42. The crankshaft, which protrudes from housing 46, is threaded at its tip 48 to receive lock nut 50 which, together with lock plate 51 holds the sprocket in retained assembly.

The hub and its radially extending lugs are mounted for limited rotational movement within the internal cavity of rim 26. In addition to carrying teeth 20 about its circumference, the rim also has a plurality of inwardly extending ears 52, 54 adapted to mate with the lugs 38, 40 of the hub, torque being transmitted from the hub member lugs to the ears of the toothed rim member through the resilient cushioning means 28 in the forward direction and reversing cushions 30 in the opposite direction. It is preferred that the cushion means be precompressed (interference fit), as shown, with its side surfaces exerting a biasing force against the lugs and ears of the assembly, the advantages including initial elimination of free play, and reduction of free play due to compression set after extended use.

The cushioning means is configured with respect to the rim and hub to define a captive void volume or cavity (under no load) to permit, in use, angular deflection of the hub relative to the rim. The void volume and angular deflection may be tailored to the specific application. The captive void volume shown in FIGS. 2 and 3 is determined by the total volume occupied by the resilient cushion 28 together with side clearances 56, 58 i.e., the bound volume between lug 40 of the hub and ear 52 of the rim, side bearing plates 31 and 32, and arcuate connecting portions 60 and 62 of the hub and rim, respectively.

The resilient cushioning means preferably is configured to have arcuate top and bottom surfaces 70, 72, diverging side surfaces 74, 76 and substantially planar and preferably generally parallel front and rear faces 78, 80.

In accordance with one aspect of the invention, the cushioned spring members 28, 30 are comprised of bodies of suitable elastomeric material loaded with modulus and hysteresis-increasing fibrous reinforcement. It is preferred that the fibers are generally uniformly dispersed within the elastomeric matrix, as shown in FIG. 4 which is a schematic drawing of an S.E.M. photomicrograph of a transverse section of the cushion, at 36X. The elastomeric matrix itself preferably has good compression set, high fatigue life, and resistance to any environmental materials, such as oil and grease in accordance with the application. For instance, nitrile rubber compounds have been found useful in the motorcycle sprocket application. Various natural and synthetic rubbers may be utilized and blends thereof, also with other compatible polymeric materials such as thermoplastic resins as well as some thermosets.

The reinforcing fibers must be compatible with the elastomeric matrix and for this purpose may be coated or treated to achieve adhesion with the base elastomer. Various organic and inorganic fibers are useful and the specific choice will be again dictated by the particular application. In general, organic fibers made from polyester, nylon, rayon, cellulosics such as hard and soft woods, cotton linters, aramids, and the like are useful; typical inorganic fibers blendable with the elastomeric cushions include fiber glass, metallic fibers, carbon fibers and the like. The fibers may typically have lengths averaging from about 0.4 to about 12.7 millimeters and more preferably from about 1 to about 6.4 millimeters, and aspect ratios preferably from about 30:1 to about 350:1 and more preferably from about 50:1 to about 200:1.

Although the loading levels of the fibers based on the finished resilient cushions will vary in accordance with the application and modulus/dampening characteristics required, in general it is preferred to employ from about 3 to about 50, more preferably from 3 to about 30 and most preferably from about 4 to about 10 percent fibers by volume based on the overall cushion volume.

Although not narrowly critical, it has been found highly advantageous to orient the fibers 64 predominantly at right angles to the principal direction in which the cushions are placed under load. If directions of the principal strains are known, an efficient use of fibers is to orient them along these maximum and/or minimum principal strain axes. With respect to FIGS. 3 and 4, in use the cushions 28 and 30 are displaced both in a direction parallel to the axis of rotation of the assembly as well as circumferentially, so as to tend to fill up the adjacent side cavities 56, 58 respectively and to scrub circumferentially along the inner surface 62, of the driven rim. As seen in FIG. 4, the bulk 64 of the individual fibers are generally aligned in this axial direction, whereby under load the individual aligned fibers 64 in the cushions are placed in tension to thereby resist displacement of the cushions in the direction tending to fill the adjoining captive void cavities. This has the result of very substantially increasing the transverse modulus of the cushion in use.

In certain other applications and depending upon the shape of the individual cushion, and the positioning of the adjacent cavities which will define the principal strain axes, a random orientation of the embedded fibers may be useful.

Although fiber loading is known to normally reduce fatigue resistance of an elastomeric part, and produce a somewhat poorer compression set, with the subject invention these problems are largely overcome by designing the cushion with respect to the adjoining cavities so that minimum strain levels are imposed axially on the cushion. The higher modulus material thereby undergoes less strain and hence the fatigue resistance and compression set problems are substantially minimized.

It is another aspect of the invention in its preferred form to utilize fibrous loading material which swells appreciably when contacted with environmental materials, such as oil and grease used in bearings of the hub and rim. In this manner the cushions swell appreciably and this swelling offsets a portion or all of the compression set which is induced after extended flexing of the cushions under cyclic loading and unloading. As a working example, cellulosic fibers marketed under the name Santoweb K (Monsanto Company) formed of a hardwood cellulosic fiber of approximately 0.018 to 0.025 mm average fiber diameter, with a typical average aspect ratio of 55, was used. This fiber was treated for improved adhesion to nitrile and then uniformly dispersed at a level from about 4 to about 8 percent by volume in a banbury mixer with a typical nitrile (NBR) rubber compound additionally comprising carbon black loading, oil extender, accelerators and vulcanizing agents. After thorough dispersion the resilient blocks were molded so as to orient the fibers as shown in FIG. 4. These blocks had a tensile strength at break of 1500 psi, elongation at break of 100 percent, a durometer of 88 Shore A, compression set of 32 percent after 22 hours at 212° F. (compressed to 25 percent of original height), a compression set of 57 percent after 70 hours at 250° F., and an increase of 17 percent in volume after immersion in railroad airbrake grease (A.A.R. Specification No. M-914) for one week at 212° F. Thus, significant swell took place which tends to offset compression set during use.

Although it is preferred to use cushions which are solid, in appropriate applications perforations or holes such as disclosed in copending application Ser. No. 85,655, referred to above, may be used to provide the advantages disclosed in that application.

Figure 7:
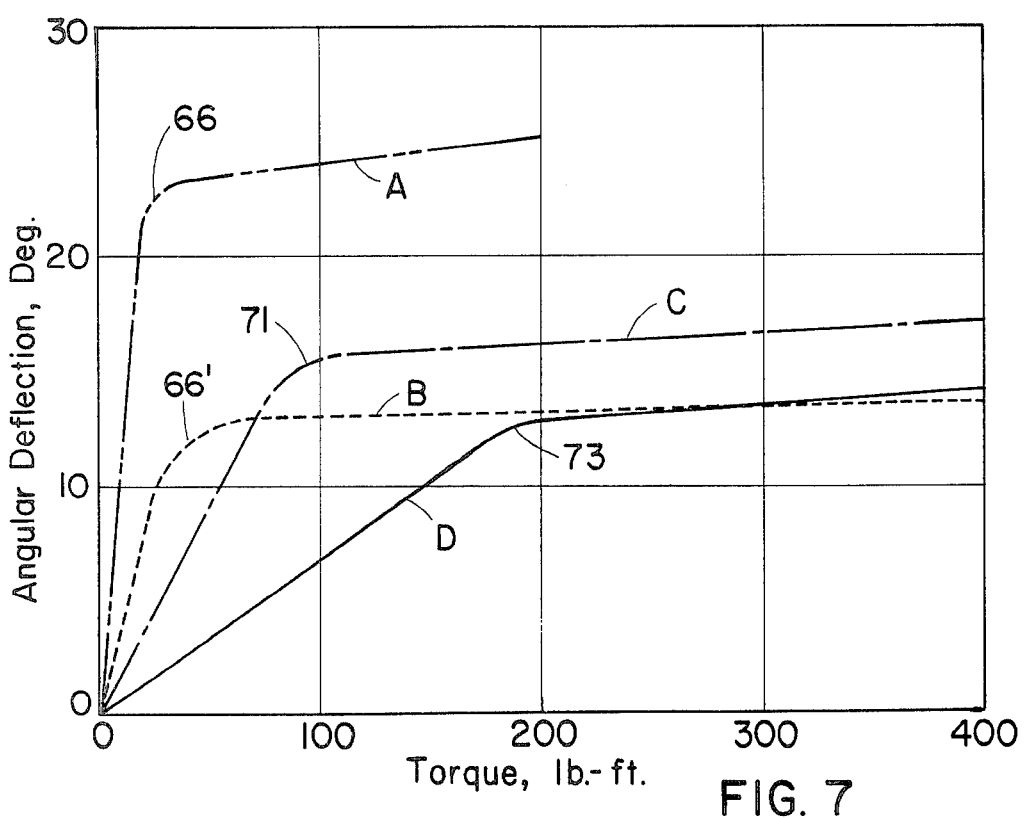
FIG. 7 is a graph of angular deflection versus torque for the sprocket shown in FIGS. 1-3, comparing different cushioning materials.

The torque/angular deflection curve ("D") for the resilient cushions of this aspect of the invention (FIGS. 1–4) compared with prior art cushions (curves A and B) and an experimental cushion (curve C) without fiber loading are shown in FIG. 7. All curves were generated using the sprocket assembly of FIGS. 1–3 of the drawings. Curve A is the torque deflection relationship using a standard nitrile elastomeric stock with holes penetrating the cushions in the axial direction, as shown in the aforementioned copending Ser. No. 85,655. Curve B utilizes the same material and construction as Curve A with the exception that the blocks were solid (no holes). In each of Curves A and B the breakover point or "knee" 66, 66' was less than about 50 lb-ft. torque. Curve C on the other hand represents a special carboxylated nitrile stock of high modulus purposely compounded to attempt to achieve a much higher torque at the breakover point 71. Curve D, of the invention, however, achieved a significantly higher breakover point 73 approximating 190 lb-ft. torque, providing a much greater ability to withstand torque transients in the drive train, with minimal backlash and simultaneously accommodating angular deflections of preferably greater than 8 degrees. The resilient cushions used with respect to Curve D employed the nitrile compound discussed in the above example loaded with 6% by volume Santoweb K.

The fiber-loaded cushion represented by Curve D above has successfully solved the "speed shift" problem mentioned above, for motorcycle drives.

Although not narrowly critical, the slope of the torque/deflection curve (below the "knee") is preferably from about 0.02 to about 0.2, more preferably from about 0.03 to about 0.09 for the function degrees/lb-ft. The high modulus cushion enables slopes within these desirable ranges to be obtained. Simultaneously, the corresponding breakover point ("knee") is preferably at least about 100 lb-ft., more preferably at least about 150 lb-ft. of torque.

Figure 6:
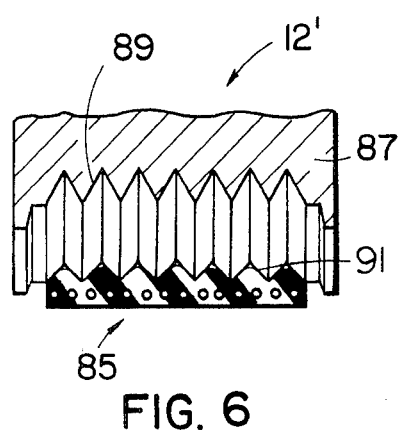
FIG. 6 is a partial sectional view along 6—6 of FIG. 5.

In FIG. 5, an alternative application is shown in which a shock-absorbing torsionally elastic belt sheave 12' is employed in a serpentine accessory drive for a transverse mounted diesel automobile engine. In this example, sheave 12' is coupled directly to the engine crankshaft. Sheave 12' is coupled in driving relationship to a backside water pump sheave 75 (to which an offtake belt, not shown, may couple a vacuum pump), air conditioner sheave 77, alternator sheave 79 and power steering sheave 81, a tension applying backside idler 83, all coupled by serpentine belt 85. In general, at least three sheaves are linked by the belt in driving relation. As shown more clearly in FIG. 6, belt 85 may be a typical reinforced endless power transmission belt of V-ribbed construction whose individual ribs 91 wedge into or make frictional contact with corresponding V-grooves 89 formed on the driving circumference of sheave 87. The use of a torsionally elastic sheave 12' in this application constructed in accordance with the invention using cushions 28', 30' of high modulus (preferably fiber loaded) or unloaded cushions of relatively soft elastomeric material results in a number of advantages including reduction of engine rpm excursions and induced vibration or wobble, as well as damping torque peaks in the drive train. This has been found to translate into tremendously longer belt and drive life.

In an actual comparative test on a transverse mounted 90° V-6 diesel engine serpentine accessory drive of the type shown in FIG. 5, three different crank sheaves 12' were employed. Change in rpm (excursion) at a given rpm level approximating engine idle was measured as was sheave temperature (qualitatively). The first crankshaft sheave was the control, a standard sheave of the type shown partially in FIG. 6, without provision of any elastomeric blocks or other torque compensation. The second and third crankshaft sheaves employed the compensator sheave 12' of the invention using, respectively, cushions 28', 30' loaded with from about 4 to about 8 volume percent Santoweb K per the example mentioned previously herein, and unloaded relatively soft elastomeric cushions 28', 30' made of 35 percent acrylonitrile NBR reinforced with carbon black and having a modulus of 600 psi at 100 percent elongation, and a tensile strength of about 1800 psi at break (350 percent elongation). With the control, the excursion defined as the maximum change in rpm per engine cylinder from idle (600 rpm) was about 13 rpm; with the compensator of the invention using high modulus fiber reinforced cushions the excursion was about 9 rpm; and for the compensator of the invention using relatively soft cushions the excursion was only about 2.5 rpm. The control sheave (without torsional compensation) caused the belt to slip about 6 degrees and the sheave became so hot after a few minutes of engine operation that it scorched the V-ribbed belt. The torsionally elastic sheave with the high modulus fiber-loaded cushion became hot but did not burn or scorch the belt. The third torsionally elastic sheave, with the softer cushions, heated only slightly whereby it was possible to hold onto the sheave (by hand) virtually indefinitely. Of course, the lower the rpm excursion, the lower the vibration level, belt slip and belt elastomeric material shear and the longer the expected belt and drive train life. With low excursions it is also possible to reduce flywheel weight, etc.

In the drive embodiment of FIG. 5 it is preferred to limit the captive void volume between the cushions 28', 30' and adjacent sheave components (i.e., hub, rim, etc.) so as to achieve angular deflections from about 0.1 to about 8, more preferably from about 3 to about 7 degrees at 100 lb-ft. torque.

While certain representative embodiments and details have been shown for the purpose of illustrating the invention, it will be apparent to those skilled in this art that various changes and modifications may be made therein without departing from the spirit or scope of the invention.

What is claimed is:

1. A shock-absorbing torsionally elastic power transmitting device comprising:
   a rotatable input drive means;
   a rotatable output driven means; and
   resilient spring cushions linking the input drive means to the output driven means in power transmitting relation and displaceable under load, said cushions comprising bodies of elastomeric material loaded with modulus and hysteresis-increasing fibrous reinforcement.

2. The power transmitting device of claim 1 wherein one of said drive means and driven means is a hub rotatable about a drive axis and having lugs engaging the cushions, and the other is a rim coaxially rotatable with the hub through mating ears also engaging the cushions.

3. The power transmitting device of claim 1 wherein the fibrous reinforcement is in the form of discrete embedded fibers oriented predominantly in the direction of a principal strain axis of the cushion under load.

4. The power transmitting device of claim 3 wherein the orientation is predominantly parallel to the axis of rotation.

5. The power transmitting device of claim 1 wherein the fibrous reinforcement is substantially uniformly dispersed within a cushion and present in an amount from about 3 to about 30 percent by volume of the cushion.

6. The power transmitting device of claim 1 whose characterizing torque deflection curve has a slope from about 0.03 to about 0.09 for function degrees/lb-ft. below the breakover point ("knee").

7. The power transmitting device of claim 1 whose characterizing torque deflection curve has a breakover point ("knee") corresponding to greater than 150 lb-ft. torque.

8. The power transmitting device of claim 2 wherein the rim has a peripheral surface configured to receive an endless power transmission belt.

9. A shock-absorbing torsionally elastic belt sprocket or sheave assembly comprising:
   a rotatable hub having at least two lugs protruding radially therefrom;
   a rotatable rim with at least two radially inwardly extending ears adapted to matingly engage the lugs of the hub, and having a peripheral surface configured to engage an endless power transmission belt; and
   resilient cushions interposed between the lugs and ears, comprising elastomeric material in which is embedded discrete reinforcement fibers functioning to substantially increase the dynamic modulus and hysteresis of the cushions.

10. The belt sprocket or sheave assembly of claim 9 wherein a void volume is provided between the resilient cushions and adjacent assembly components whereby the cushions are displaced under load in a direction to fill said void volume, and wherein said reinforcement fibers are oriented within the cushions primarily in said direction.

11. The belt sprocket or sheave assembly of claim 9 wherein said fibers are formed of cellulosic material, swellable in petroleum-based lubricants.

12. The belt sprocket or sheave assembly of claim 9 wherein said fibers are formed of inorganic material.

13. The belt sprocket or sheave assembly of claim 9 wherein said fibers are oriented generally along the axis of rotation of the hub and rim.

14. In a vibration resistant torsionally elastic rotatable power transmitting device having a hub with at least two lugs protruding radially outwardly therefrom, and a rim with at least two radially inwardly extending ears adapted to matingly engage the lugs of the hub, an improved resilient cushion spring means adapted to be interposed between the lugs and ears to transmit torque therebetween, comprising an elastomeric body in which is embedded a multitude of discrete reinforcing fibers serving to increase the modulus and hysteresis of the cushion spring means.

15. The cushion spring means of claim 14 wherein the fibers are predominantly oriented parallel to one another.

16. The cushion spring means of claim 14 wherein the fibers are randomly oriented.

17. A shock-absorbing torsionally elastic belt sprocket or sheave assembly comprising:
    a rotatable hub having at least two lugs protruding radially therefrom;
    a rotatable rim with at least two radially inwardly extending ears adapted to matingly engage the lugs of the hub, and having a peripheral surface configured to engage an endless power transmission belt; and
    resilient cushions interposed between the lugs and ears and spaced from a portion of the assembly and which comprise solid bodies of oil and grease resistant elastomeric material in which is substantially uniformly embedded discrete modulus and hysteresis-increasing reinforcing fibers;
    wherein said assembly is characterized by a torque/deflection curve having a breakover point ("knee") corresponding to greater than 100 lb-ft. torque.

18. The belt sprocket or sheave assembly of claim 17 wherein the reinforcing fibers are oriented generally along the axis of rotation of the hub and rim.

19. A shock-absorbing, rpm excursion reducing serpentine belt drive assembly for automotive and truck applications or the like, comprising:
    a plurality of sheaves, at least one of which is shock-absorbing and includes;
    a rotatable hub having at least two lugs protruding radially therefrom;
    a rotatable rim with at least two radially inwardly extending ears adapted to matingly engage the lugs of the hub, and having a peripheral surface configured to engage the belt; and
    resilient cushions interposed between the lugs and ears, comprised of high hysteresis elastomeric material in which is substantially uniformly dispersed reinforcing fibers;
    an endless power transmission belt trained about the sheaves in driving relation in serpentine configuration.

20. A shock-absorbing torsionally elastic single or multiple V-belt or V-ribbed belt power transmission accessory drive assembly for use with an engine exhibiting substantial speed excursions a low rpm, comprising:
    a plurality of sheaves each having a peripheral surface provided with at least one V-shaped groove on its driving surface adapted to receive the belt in driving relation:
    at least one of said sheaves being a shock-absorbing crankshaft sheave assembly, adapted to be coupled to the crankshaft of the engine, and including a rotatable hub having at least two lugs protruding therefrom, a rotatable rim having at least two radially inwardly extending ears adapted to indirectly matingly engage the lugs of the hub and having a peripheral surface formed with said at least one V-shaped groove, and resilient elastomeric cushions interposed in cavities between the lugs and ears in driving relation;
    said crankshaft sheave being provided with a captive void volume defined as an individual cavity volume less the volume occupied by the cushion contained in that cavity of such amount to allow, in operation, the hub and rim to undergo relative angular deflections of from about 3 to about 7 degrees; and
    a single or multiple V-belt and V-ribbed belt trained about the sheaves in friction driving relation.

21. The drive assembly of claim 20 in which the resilient elastomeric cushions are formed of high hysteresis elastomeric material.

22. A shock-absorbing, rpm excursion reducing serpentine belt accessor drive assembly for rough running automotive or truck engines, comprising:
    at least three sheaves having multiple V-groove surfaces, one of which is the engine crankshaft sheave which is shock-absorbing and which includes:
    a rotatable hub having at least two lugs protruding radially therefrom;
    a rotatable rim with at least two radially inwardly extending ears adapted to indirectly matingly engage the lugs of the hub, and having a peripheral multiple V-grooved surface configured to engage the belt;
    resilient elastomeric cushions interposed in cavities between the lugs and ears in driving relation;
    said crankshaft sheave being provided with a captive void volume defined as an individual cavity volume less the volume occupied by the cushion contained in that cavity of such amount to allow, in operation, the hub and rim to undergo relative angular deflections of from about 0.1 to about 8 degrees; and
    an endless V-ribbed belt trained in serpentine arrangement about the multiple V-grooved sheaves in friction driving relation.

23. The drive assembly of claim 22 in which the captive void volume is chosen to allow the hub and rim to undergo relative angular deflections of from about 3 to about 7 degrees.

24. The drive assembly of claim 23 wherein the resilient elastomeric cushions are formed of high hysteresis elastomeric material.

* * * * *